Sept. 19, 1950  R. D. MacDONALD  2,523,035
SIDE DUMP TRAILER
Filed Nov. 14, 1947  3 Sheets-Sheet 1
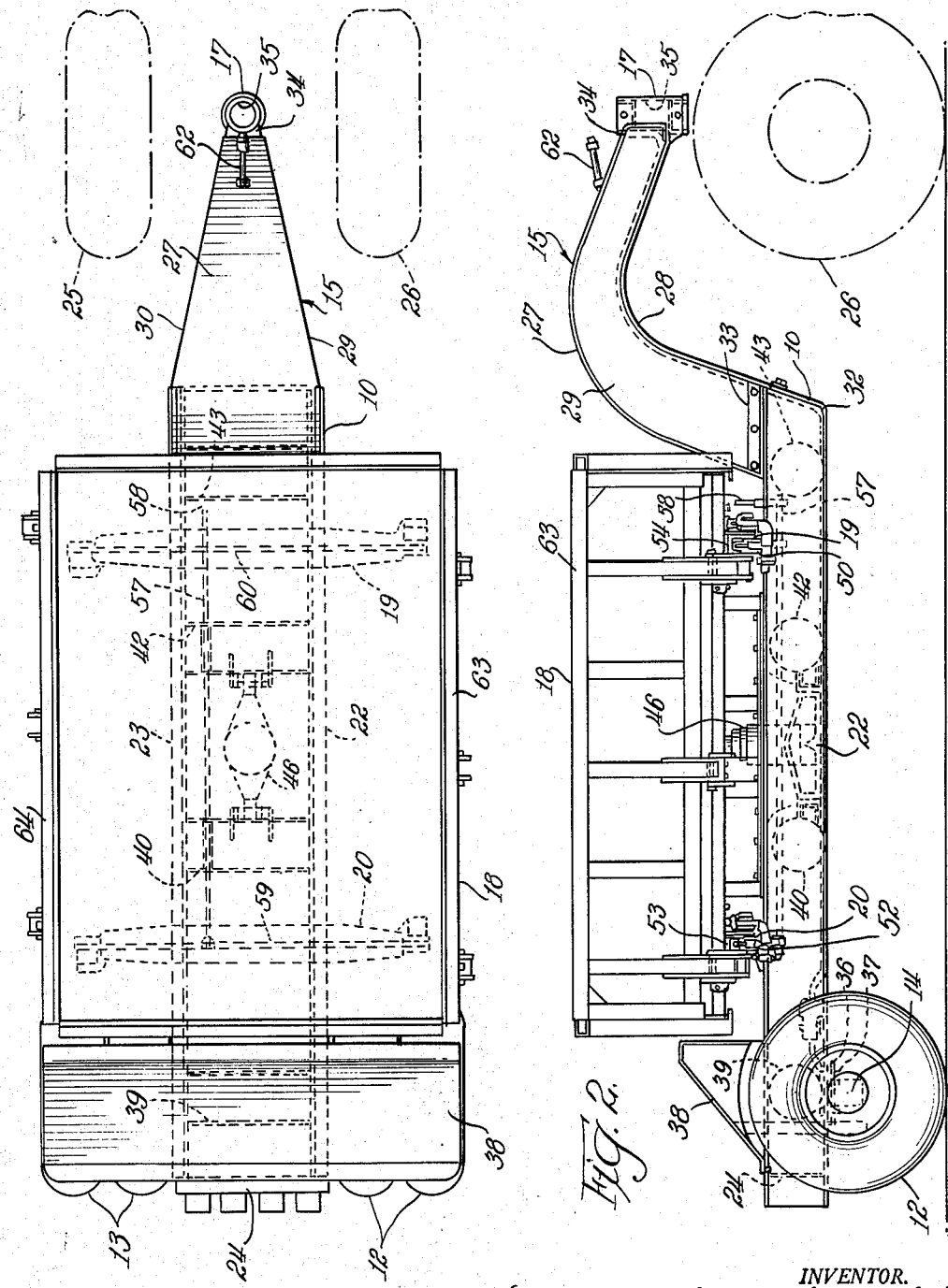
INVENTOR.
Raymore D. MacDonald
BY Albert G. McCaleb
Att'y.

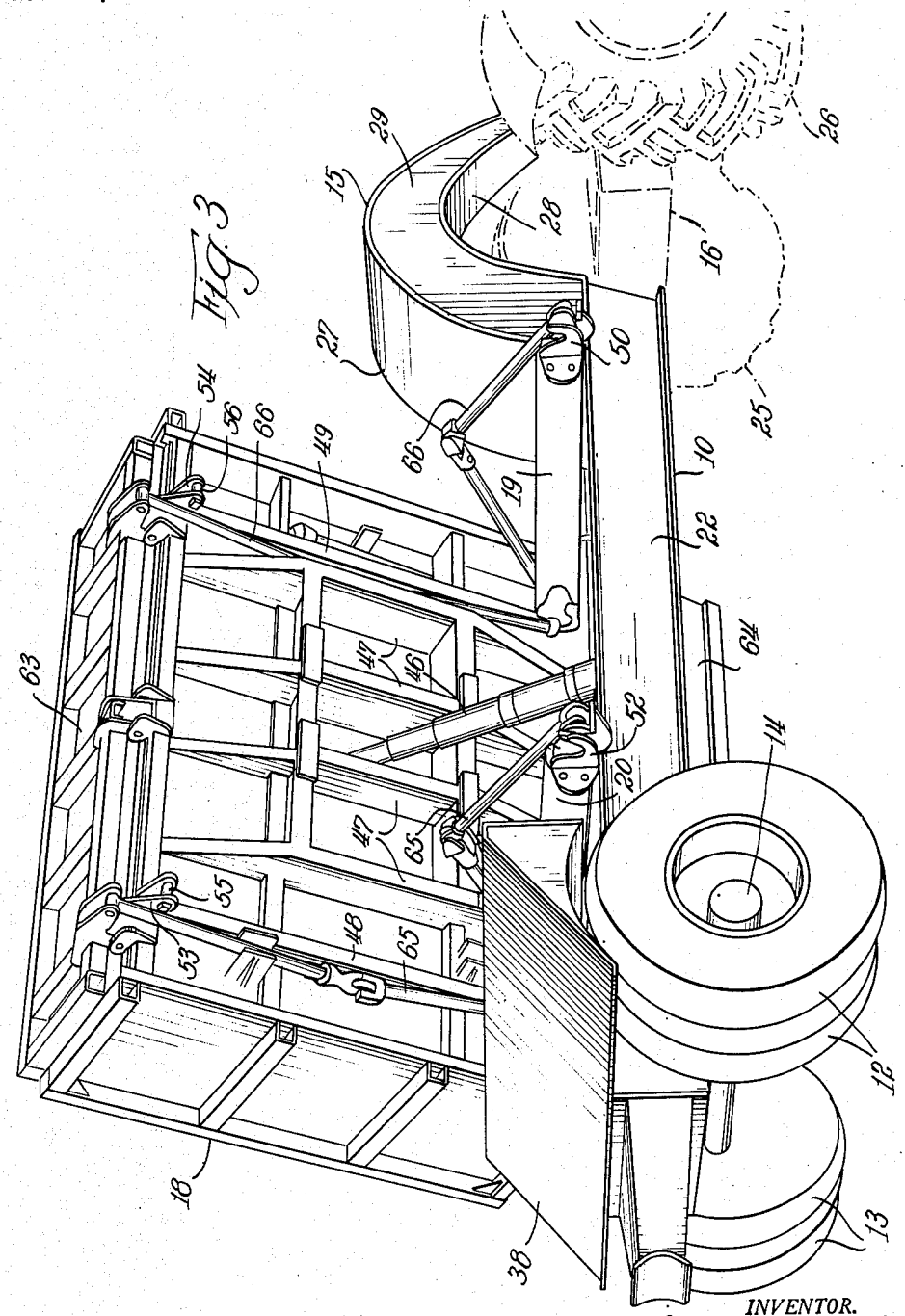

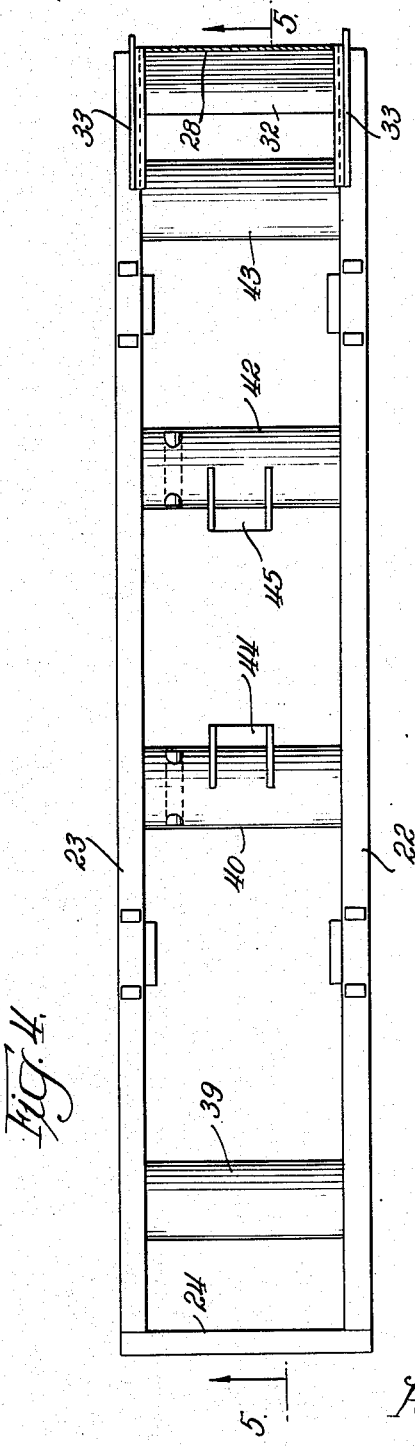
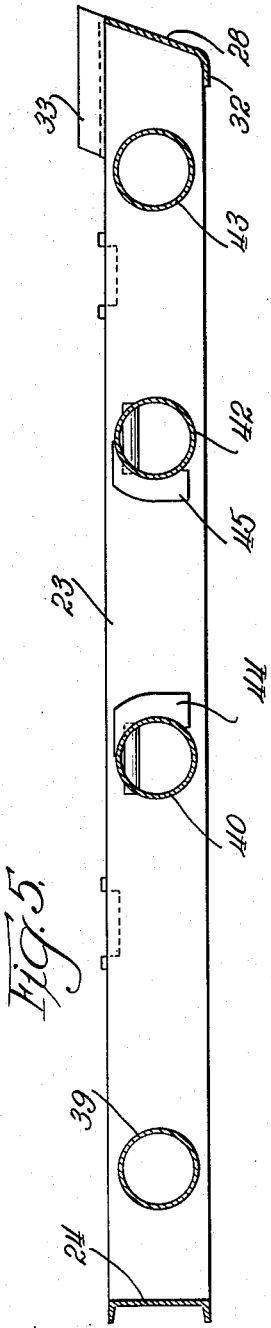

Patented Sept. 19, 1950

2,523,035

UNITED STATES PATENT OFFICE 2,523,035

SIDE DUMP TRAILER

Raymore D. MacDonald, La Grange, Ill., assignor to Athey Products Corporation, Chicago, Ill., a corporation of Illinois Application November 14, 1947, Serial No. 785,963

6 Claims. (Cl. 298—18)

This invention relates to side dump trailers, and more particularly to such trailers adapted to be attached, for motivation, to tractors and the like and having substantially three point suspension for the trailer load.

Of the many factors which enter into the design of a tractor drawn side dump trailer for carrying large and heavy loads, some of the more important ones lead to conflicting considerations and require the solution of problems resulting in an ultimate structure having satisfactory capacity, characteristics and ruggedness. For example, to promote stability for the carrying of heavy loads with standard wheel spacing, the center of gravity of the structure and its load is preferably kept low. This limits the desirable width of the supporting underframe to a dimension permitting its mounting between the wheels adjacent the axle. Furthermore, the ability to carry heavy loads requires double wheels and large tires. This tends additionally to limit the width of the supporting underframe. On the other hand, large load carrying capacity tends toward the provision of a wide body, reaching substantially the clearance limits of the wheels. Tractor motivation adds to the considerations the provision of strength, stability and ruggedness with three point suspension.

Having such factors in mind, the requirement of tilting the body to either side relative to the underframe for dumping introduces additional and serious problems of underframe stresses and general stability—particularly with the three point suspension of the underframe, and the practical necessity of hinging the body for side tilting movements well outside of the sides of the underframe.

It is therefore a general object of my invention to provide a rugged, durable and stable underframe structure for a tractor motivated side dump trailer wherein the underframe is supported at one end by laterally separated wheels and at the other end by a swivel connection to a tractor or the like.

The invention further has within its purview the provision of an underframe structure for a tractor drawn side dump trailer which, although necessarily subjected to off-balance loads and torsional stresses during dumping operations, is braced to minimize the transmission and application of such stresses to the tractor connection.

As a further object, this invention comprehends the provision of an underframe designed, without the addition of undesirably excessive weight, to the resistance of heavy shock loads, torsional and unbalanced stresses.

Other objects and advantages of the invention will be apparent from the following description and the accompanying drawings in which similar characters of reference indicate similar parts throughout the several views.

In the three sheets of drawings:

Figs. 1 and 2 are respectively top plan and side elevational views of a side dump trailer structure embodying a preferred form of my invention and wherein the positions of the wheels of a motivating tractor or the like are indicated in dot and dash lines;

Fig. 3 is a perspective view taken from the rear and to one side of the side dump trailer structure shown in Figs. 1 and 2 with the body tilted to a dumping position relative to the trailer underframe, and wherein the tractor is generally indicated in dotted lines;

Fig. 4 is a fragmentary top plan view of a portion of the structure embodied in the side dump trailers in Figs. 1, 2 and 3; and Fig. 5 is a side sectional view of a portion of the trailer structure shown in Fig. 4 and wherein the section is taken substantially on a line 5—5 of Fig. 4.

Considered generally, the side dump trailer which is depicted in the accompanying drawings for illustrative purposes includes an underframe 10 ruggedly built for the hauling of heavy loads and supported at its rear end by double wheels 12 and 13 on opposite ends of an axle 14. At its front end, the underframe 10 includes a gooseneck connecting element 15 adapted to be connected to and supported from a tractor 16 or the like through a swivel connecting element 17. On the top of the underframe 10, and preferably between the gooseneck element 15 and the wheels 12 and 13, an open top body 18 is carried by cross beams 19 and 20 for selective tilting movement to either side relative to the underframe.

Considered more specifically, the underframe 10 includes side beams 22 and 23 which are preferably of channel section and disposed with their channels facing outwardly. For structural purposes, the side beams 22 and 23 are also desirably disposed longitudinally of the trailer in substantially parallel relationship with one another and spaced laterally of the trailer as far apart as practical between the inner surfaces of the wheels 12 and 13, leaving only a reasonable clearance between the wheels and the side beams. By separating the side beams as much as possible, the lateral support for the trailer body and its operating stability are improved. In the instance of a trailer built for lighter service and embodying single wheels for carrying the load, the side beams could be more widely spaced than in a structure such as that disclosed which is built for hauling heavy loads and withstanding the shock loads encountered when the trailer is loaded by a power shovel or the like.

At the rear end of the underframe, the side beams 22 and 23 are connected by a cross beam 24 which also is desirably of channel section and is secured at its ends to the respective side beams by welding, or the like. At their forward ends, the side beams 22 and 23 are connected to the gooseneck connecting element 15.

In my preferred type of structure for the gooseneck connecting element, it is of rectangular hollow section tapering inwardly in a lateral direction toward the front and the swivel connecting element 17. Also, the gooseneck connecting element extends upwardly adjacent the front end of the underframe and then forwardly with a contour adapted to avoid interference with turning movement of the tractor wheels such as 25 and 26.

My preferred structure for the gooseneck connecting element embodies tapered upper and lower plates 27 and 28 respectively secured by welded seams or the like along the edges thereof to shaped side plates 29 and 30.

For securing the gooseneck connecting element to the underframe, it is my preference that the lower plate 28 shall have a portion 32 extended downwardly along the front ends of the side beams and formed to underlie front end portions of those side beams, as depicted in Figs. 4 and 5; the said lower plate being secured to the side beams by welding. In addition to being directly secured to the upper surfaces of the side beams, the joints between the side plates 29 and 30 and the respective side beams are preferably reinforced by angle strips such as 33. At their forward ends, plates 27, 28, 29 and 30 are secured by welding to a fitting 34 which is either integrally formed upon or welded to a swivel connecting element 17, which swivel connecting element, of course, has a bore 35 for making a swivel connection to a suitable fitting on a tractor or the like.

The side beams 22 and 23 at the rear end of the underframe are carried directly by the axle 14. As depicted in Fig. 2, blocks such as 36 are secured to the lower sides of the side beams and rest upon the axle. Fastening means such as U-bolts 37 are utilized to secure the axle in place relative to the blocks 36. Desirably, the position of the axle relative to the side beams is such that the wheels are set in somewhat from the rear extremity of the underframe. Also, by preference, a guard plate 38 extends across the underframe to the rear of the body 18 and projects laterally over the wheels 12 and 13 to provide protection during the loading of the body. The disclosed guard plate is an integral and formed plate secured to the underframe and presenting a top surface which slopes downwardly from a position closely adjacent to the rear end of the body.

The underframe being supported on opposite sides at the rear from the wheels and through the axle, and having only a single and centralized support at the front through the gooseneck connecting element and swivel connecting element, the supported load is carried through what may essentially be considered a three point support. Off-balance loads and those resulting during the tilting of the body relative to the underframe for dumping on one side or the other, not only set up normal off-balance force moments in the underframe structure, but also apply torsional stresses to the underframe which increases with the distance forwardly of the underframe from the two point lateral support provided through the wheels and axle.

Further to rigidify the underframe for withstanding such off-balance loads and torsional stresses, I have provided a plurality of tubular cross braces 39, 40, 42 and 43 spaced longitudinally of the side beams 22 and 23 and extending therebetween with their opposite ends abutting the inner faces of the side beams and secured thereto by welding. In section, these cross braces may be either polygonal or of the circular shape shown. Preferably, however, their sectional sizes are large compared to the width of the side beams. As a result of the three point type of suspension utilized in the disclosed structure and the consequent increase of stresses toward the front of the underframe, the spacing between adjacent ones of the cross braces 39, 40, 42 and 43 is decreased toward the front.

In my preferred structure, the cross brace 39 has a position adjacent the axle 14. The cross brace 43 extends between the side beams at a position adjacent the junction of the grooseneck connecting element with the side beams. While the spacing between the adjacent cross braces decreases toward the front of the underframe, the cross braces 40 and 42 occupy positions intermediate the cross braces 39 and 43 and on opposite sides of the mid-portion of the body. With this arrangement of the cross braces, and in a hydraulically actuated side dump trailer such as that disclosed, brackets 44 and 45 are secured to the mid-portions of the cross braces 40 and 42 and extend in opposed relationship therefrom to serve as the underframe supports for a hydraulic jack mechanism 46.

In addition to a plurality of longitudinally spaced and laterally disposed trusses 47 which extend across and rigidify the bottom of the body 18, cross beams 48 and 49 extend across the bottom surface of the body at positions aligned for engagement with the cross beams 20 and 19 respectively on the underframe. Thus, the body is normally carried from the underframe by the cross beams 19 and 20.

For maximum body capacity within allowable lateral clearance limits, the body has a width at least equal to the distance between the outer surfaces of the wheels 12 and 13. Hence, for providing adequate body support and for dumping the body loads at positions clear of the trailer sides, the cross beams 19 and 20 project outwardly in a lateral direction and substantial equal distances on the opposite sides of the underframe. At their opposite ends, these cross beams carry hinge elements such as 50 and 52 which in the present instance, are in the form of upwardly opening and substantially U-shaped fingers. On the body adjacent the opposite ends of the cross beams 48 and 49, hinge parts such as 53 and 54 are mounted, which hinge parts include rollers 55 and 56 in longitudinally aligned relationship on opposite sides of the body for engagement with the fingers of the hinge elements 52 and 50 respectively. As depicted in Figs. 1 and 2, a shaft 57 extends longitudinally of the underframe between the side beams 22 and 23 and is supported therefrom for rotational movement. A handle 58 is mounted at one end of the shaft at a position accessible from the exterior of the trailer. Suitable linkages responsive to the rotational movement of the shaft 57 actuate cross rods 59 and 60 to one side or the other, thereby to lock the hinge elements and hinge parts together on one side of the trailer.

Fluid pressure for the actuation of the hydraulic jack mechanism 46 is supplied from the tractor through a fitting 62 which projects from the gooseneck connecting element and has suitable fluid flow lines connected thereto and to the cylinder of the jack mechanism. With the hinge parts released on one side of the trailer and locked on the other side thereof, the force of the jack mechanism applied to the mid-portion of the body tilts the body toward the side upon which the hinge parts are locked. In the type of body disclosed, the side panels 63 and 64 are hingedly secured to the opposite sides of the body to open and swing outwardly at the top on the side toward which the body is dumped. Links 65 and 66 near opposite ends of the body effect this outward swinging movement of the side panels automatically as the body is tilted relative to the underframe.

From the foregoing description and reference to the accompanying drawings, it may be readily understood that I have provided a rugged side dump trailer structure adapted to three point support in association with a motivating tractor or the like, which trailer structure is not only suited to the hauling of large and heavy loads and to withstand shock forces, but which is also braced without excessive weight to withstand off-balance loads and the stresses which occur in the dumping operation.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a trailer having laterally spaced wheels at one end and adapted to be connected through a swivel connection at the other end to a tractor or the like and having a body thereon supported for tilting movement to either side for dumping, the combination comprising an underframe including substantially parallel and longitudinally extending side beams disposed in laterally spaced relationship, a beam secured to and extending laterally between the side beams at one end thereof, a gooseneck connecting element of rectangular hollow section secured to and extending longitudinally away from the other ends of the side beams, load carrying cross beams secured to the tops of the side beams and extending laterally thereof at longitudinally spaced positions inwardly of the ends of the side beams, said load carrying cross beams projecting beyond the opposite sides of the side beams and carrying hinge elements at each end to provide opposed pairs of aligned hinge elements on opposite sides of the side beams, and said underframe being laterally braced to withstand heavy off-balance and torsional stresses by a plurality of tubular members spaced longitudinally of the side beams and rigidly secured thereto.

2. In a trailer as defined in claim 1, said tubular members being more closely spaced together longitudinally of the side beams as their positions approach the ends of the side beams to which the gooseneck connecting element is secured.

3. In a side dump trailer adapted to be connected through a swivel connection at one end to a tractor or the like, the combination comprising an underframe having longitudinally extending and substantially parallel side beams connected at one end by an end member, a gooseneck connecting member secured to and extending from the other ends of the side beams and having swivel connecting means at the extending end thereof, double supporting wheels in opposed positions adjacent the side beams and near the ends thereof opposite the gooseneck connecting member, an axle carried by said wheels and having said side beams secured thereto, load carrying cross beams extending laterally across the upper surfaces of the side beams at positions separated longitudinally of the side beams and intermediate the wheels and gooseneck connecting element, said cross beams projecting beyond the opposite sides of the side beams and having hinge elements at each end to provide opposed pairs of aligned hinge elements spaced from opposite sides of the side beams, and said underframe being braced for rigidity by a plurality of tubular cross members spaced longitudinally of the underframe and having their opposite ends abutting and rigidly secured to the inner surfaces of the side beams.

4. In a side dump trailer as defined in claim 3, the combination being further characterized by one of said tubular cross members being adjacent said axle, another of said tubular cross members being adjacent the end of the gooseneck connecting element, and a pair of said tubular members being disposed in spaced relationship between the aforementioned tubular members and carrying a support for a body lifting hoist.

5. In a side dump trailer as defined in claim 3, the combination being further characterized by one of said tubular cross members being disposed near said axle, another of said tubular cross members being at the gooseneck ends of the side beams, and the distance between adjacent ones of said tubular cross members decreasing from the axle to the gooseneck connecting element.

6. In a side dump trailer adapted to be attached to and supported at one end by a tractor or the like, the combination comprising wheels in spaced relationship and supporting an axle therebetween, an underframe having longitudinally extending side beams supported near one end by and secured to the axle at positions closely adjacent the inner surfaces of the wheels, a gooseneck connecting element secured to the ends of said side beams remote from said wheels, load carrying cross beams carried on the upper surfaces of said side beams and projecting laterally outwardly therefrom, each of said cross beams having a hinge element at its outer ends to provide aligned hinge elements equally spaced outwardly on opposite sides of the underframe, and said underframe being braced to withstand the off-balance and torsional forces effected by the tilting of the body for dumping by a plurality of tubular cross braces in spaced relationship longitudinally of the side beams and having their opposite ends secured to the inner surfaces of the side beams.

RAYMORE D. MacDONALD.

(References on following page)

REFERENCES CITED

The following references are of record in the file of this patent:

UNITED STATES PATENTS

| Number | Name | Date |
|---|---|---|
| 1,728,460 | Weber et al. | Sept. 17, 1929 |
| 1,909,969 | Kuchar | May 23, 1933 |
| 2,023,700 | Rodler | Dec. 10, 1935 |
| 2,025,753 | Kuchar | Dec. 31, 1935 |
| 2,029,995 | Flowers | Feb. 4, 1936 |
| 2,360,456 | Weierbach | Oct. 17, 1944 |
| 2,436,017 | Powers | Feb. 17, 1948 |

FOREIGN PATENTS

| Number | Country | Date |
|---|---|---|
| 516,577 | France | 1920 |